(12) United States Patent
Hu et al.

(10) Patent No.: US 10,260,713 B2
(45) Date of Patent: Apr. 16, 2019

(54) BACKLIGHT MODULE AND DISPLAY DEVICE

(71) Applicant: BOE TECHNOLOGY GROUP CO., LTD., Beijing (CN)

(72) Inventors: Nannan Hu, Beijing (CN); Xin Wang, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 15/531,232

(22) PCT Filed: Nov. 18, 2016

(86) PCT No.: PCT/CN2016/106353
§ 371 (c)(1),
(2) Date: May 26, 2017

(87) PCT Pub. No.: WO2017/215193
PCT Pub. Date: Dec. 21, 2017

(65) Prior Publication Data
US 2018/0187864 A1  Jul. 5, 2018

(30) Foreign Application Priority Data

Jun. 17, 2016  (CN) .......................... 2016 1 0439638

(51) Int. Cl.
*F21V 14/02* (2006.01)
*G02F 1/1335* (2006.01)
*F21S 4/28* (2016.01)

(52) U.S. Cl.
CPC ................ *F21V 14/02* (2013.01); *F21S 4/28* (2016.01); *G02F 1/133605* (2013.01);
(Continued)

(58) Field of Classification Search
CPC ...... F21V 14/02; F21S 4/28; G02F 1/133605; G02F 1/133603; G02F 2001/133626; G09G 2320/028; G09G 2320/068
See application file for complete search history.

(56) References Cited

U.S. PATENT DOCUMENTS 5,749,646 A * 5/1998 Brittell .................... F21S 10/02
                                                      362/231
6,034,712 A * 3/2000 Iwasaki ...................... B41J 2/44
                                                      347/241
(Continued)

FOREIGN PATENT DOCUMENTS

CN         1702517 A     11/2005
CN       201547597 U      8/2010
(Continued)

OTHER PUBLICATIONS

The World Intellectual Property Organization (WIPO) International Search Report and Written Opinion for PCT/CN2016/106353 dated Mar. 1, 2017; 12 pages.
(Continued)

*Primary Examiner* — Andrew J Coughlin
*Assistant Examiner* — Fatima N Farokhrooz
(74) *Attorney, Agent, or Firm* — Westerman, Hattori, Daniels & Adrian, LLP

(57) ABSTRACT

A backlight module and a display device are provided. The backlight module includes a backplane containing a plurality of scattering pits, an optical member disposed above the backplane, and a plurality of light-source components each including a plurality of light-sources. The plurality of light-source components is configured between the optical member and the plurality of scattering pits, and each light-source component is rotatable to allow the plurality of light-sources having at least one of a first orientation toward the plurality
(Continued)

of scattering pits and a second orientation toward the optical member.

19 Claims, 4 Drawing Sheets

(52) U.S. Cl.
CPC ............ *G02F 1/133603* (2013.01); *G02F 2001/133626* (2013.01); *G09G 2320/028* (2013.01); *G09G 2320/068* (2013.01)

(56) References Cited

U.S. PATENT DOCUMENTS

| | | | |
|---|---|---|---|
| 2005/0162845 A1* | 7/2005 | McDermott | F21V 7/0008 362/35 |
| 2005/0243265 A1 | 11/2005 | Winlow et al. | |
| 2007/0051883 A1* | 3/2007 | Rains, Jr. | F21S 2/00 250/228 |
| 2007/0138978 A1* | 6/2007 | Rains, Jr. | F21S 2/00 315/291 |
| 2007/0263393 A1* | 11/2007 | Van De Ven | F21V 29/2212 362/362 |
| 2008/0297683 A1 | 12/2008 | Murata et al. | |
| 2008/0310158 A1* | 12/2008 | Harbers | F21K 9/54 362/240 |
| 2009/0002979 A1* | 1/2009 | Medendorp, Jr. | F21V 7/0016 362/231 |
| 2009/0002986 A1* | 1/2009 | Medendorp, Jr. | F21S 8/06 362/247 |
| 2009/0140271 A1* | 6/2009 | Sah | F21V 31/04 257/88 |
| 2009/0295266 A1* | 12/2009 | Ramer | F21V 7/0008 313/113 |
| 2010/0103659 A1* | 4/2010 | Chen | F21S 6/003 362/231 |
| 2012/0039073 A1* | 2/2012 | Tong | F21V 7/0008 362/231 |
| 2013/0099264 A1* | 4/2013 | Zimmerman | H01L 33/64 257/89 |
| 2014/0042467 A1* | 2/2014 | Livesay | H01L 33/642 257/88 |
| 2014/0225132 A1* | 8/2014 | Livesay | H01L 33/641 257/88 |
| 2014/0226317 A1* | 8/2014 | Livesay | F21V 29/70 362/147 |
| 2014/0362563 A1* | 12/2014 | Zimmerman | F21V 29/004 362/147 |
| 2014/0369030 A1* | 12/2014 | Livesay | H01L 33/642 362/147 |
| 2015/0021628 A1* | 1/2015 | Medendorp, Jr. | H01L 33/0095 257/88 |
| 2015/0168782 A1 | 6/2015 | Chang | |
| 2015/0309222 A1 | 10/2015 | Woo | |

FOREIGN PATENT DOCUMENTS

| | | |
|---|---|---|
| CN | 104296008 A | 1/2015 |
| CN | 104712959 A | 6/2015 |
| CN | 105045029 A | 11/2015 |
| CN | 106090728 A | 11/2016 |
| JP | 2002006766 A | 1/2002 |
| JP | 5049701 B2 | 10/2012 |

OTHER PUBLICATIONS

State Intellectual Property Office of the P.R.C (SIPO) Office Action 1 for 201610439638.4 dated Jan. 23, 2018 10 Pages.

\* cited by examiner

BACKLIGHT MODULE AND DISPLAY DEVICE

CROSS-REFERENCE TO RELATED APPLICATION

This application is a national phase entry under 35 U.S.C. § 371 of PCT patent application No. PCT/CN2016/106353, filed on Nov. 18, 2016, which claims priority of Chinese Patent Application No. 201610439638.4, filed on Jun. 17, 2016, the entire contents of both of which are incorporated herein by reference.

TECHNICAL FIELD

The present disclosure generally relates to the field of display technology and, more particularly, relates to a backlight module and a display device.

BACKGROUND

Nowadays, display devices such as desktop computers, laptops, mobile phones, and tablets are widely used in people's day-to-day life, for either business or pleasure. However, passersby may see or peep contents displayed on the display devices, resulting in undesirable information leakage without personal privacy.

Conventional anti-peeping display products often configure an anti-peeping film in the display device to reduce the display viewing angle, thus protecting the privacy of the users. However, the anti-peeping effect of the conventional anti-peeping display products is irreversible. When a user wants to share displayed contents with other people, the relatively narrow viewing angle will make it difficult for other people to watch or read the displayed contents in a normal way, thus causing great inconvenience to the user.

SUMMARY

One aspect of the present disclosure provides a backlight module including a backplane containing a plurality of scattering pits; an optical member disposed above the backplane; and a plurality of light-source components each including a plurality of light-sources, and configured between the optical member and the plurality of scattering pits. Each light-source component is rotatable to allow the plurality of light-sources having at least one of a first orientation toward the plurality of scattering pits and a second orientation toward the optical member.

Optionally, the light-source provides a light-emitting angle of less than approximately 40 degrees.

Optionally, the backplane further contains a holding space for holding the plurality of light-sources.

Optionally, each light-source corresponds to a plurality of scattering pits.

Optionally, each light-source corresponds to one of the plurality of scattering pits.

Optionally, the light-source may have at least one dimension smaller than a corresponding scattering pit.

Optionally, a surface of the scattering pit includes optical dots.

Optionally, the backplane further includes a flat area between adjacent scattering pits, and a reflection layer is on the flat area.

Optionally, the scattering pit includes an arc-shaped cross section.

Optionally, the plurality of light-sources includes a plurality of light emitting diodes (LEDs), configured on an LED bar.

Optionally, the light-source component also includes a fixed support and a driving unit, the fixed support is connected to the backplane, the LED bar is pivoted to the fixed support, and the driving unit is configured to drive the LED bar to rotate.

Optionally, the LED includes a light-emitting chip and a lampshade, and the lampshade is configured to adjust a light-emitting angle of the LED.

Optionally, the light-emitting angle of the LED is adjusted between approximately 25 degrees to approximately 35 degrees.

Optionally, the driving unit is an electric motor, one end of the LED bar is pivoted to the fixed support, and other end of the LED bar is connected to an output shaft of the electric motor.

Optionally, the electric motor is a reciprocating motor, and a rotating range of the output shaft is approximately 180 degrees.

Optionally, the backlight module further includes a support board between the optical member and the plurality of light-source components.

Optionally, the support board is one of a polymethylmethacrylate support board and a polycarbonate support board.

Optionally, the scattering pit is configured to scatter light emitted from one or more corresponding light-sources. The scattered light passes through and exits the optical member in a first exiting angle range. The optical member is configured to receive light emitted from one or more corresponding light-sources. The light passes through and exits the optical member in a second exiting angle range. The first exiting angle range is greater than the second exiting angle range.

Another aspect of the present disclosure provides a display device, including the disclosed backlight module.

Optionally, when the plurality of light-sources is at the first orientation toward the plurality of scattering pits, the display device provides a wide viewing angle mode. When the plurality of light-sources is at the second orientation toward the optical member, the display device provides a narrow viewing angle mode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure provides a backlight module, and a display device containing the backlight module that overcomes the disadvantages of the existing display products. The disclosed display device may provide an adjustable viewing angle for switching between a wide viewing angle mode and a narrow viewing angle mode, and thus may be applied in various occasions and show improved flexibility for users.

In one embodiment, a backlight module may include a backplane containing a plurality of scattering pits and an optical member disposed above the backplane. The backlight module may also include a plurality of light-source components each including a plurality of light-sources. The plurality of light-source components may be configured between the optical member and the plurality of scattering pits. Each light-source component is rotatable to allow the plurality of light-sources having at least one of a first orientation toward the plurality of scattering pits and a second orientation toward the optical member.

Although any light-source may be used for the light-source components disclosed herein, light emitting diodes (LEDs) are used as exemplary light-sources for illustration purposes in the present disclosure. For example, one light-source component may include a plurality of LED bars, and each LED bar may be mounted with a plurality of LEDs. For example, the scattering pits may be located in an inner bottom of the backplane. The backplane may include a holding space configured for holding the light-source components at least partially in corresponding scattering pit(s).

Figure 1A:
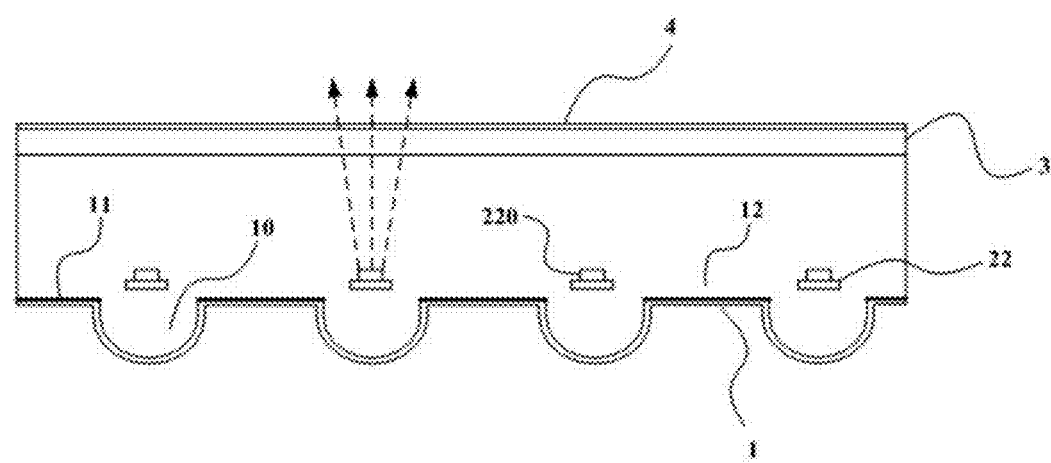
FIG. 1A is a diagram illustrating a cross-sectional view of an exemplary backlight module in a narrow viewing angle mode according to disclosed embodiments.
Figure 1B:
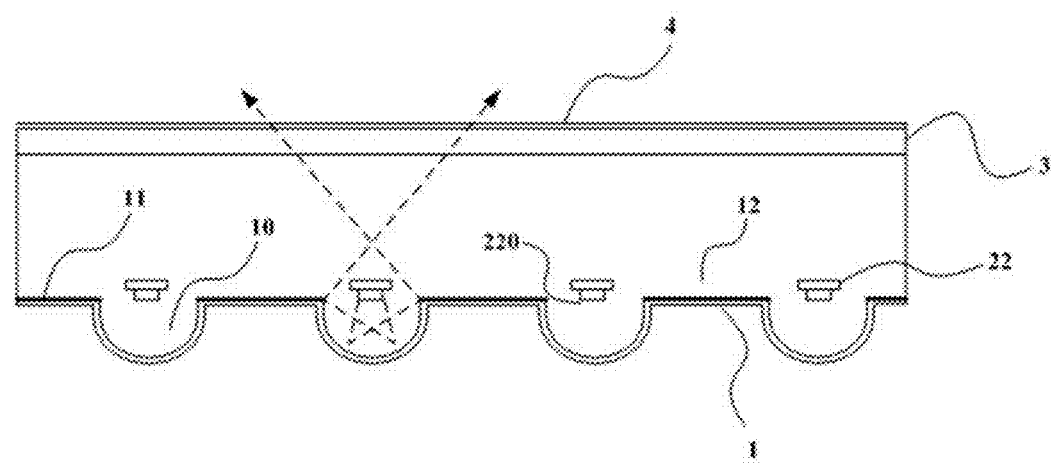
FIG. 1B is a diagram illustrating a cross-sectional view of an exemplary backlight module in a wide viewing angle mode according to disclosed embodiments.
Figure 2:
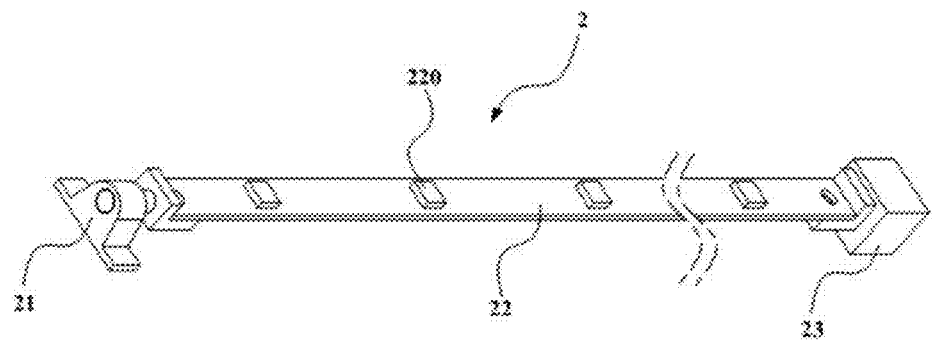
FIG. 2 is a diagram illustrating an exemplary light-source component according to disclosed embodiments.
Figure 3:
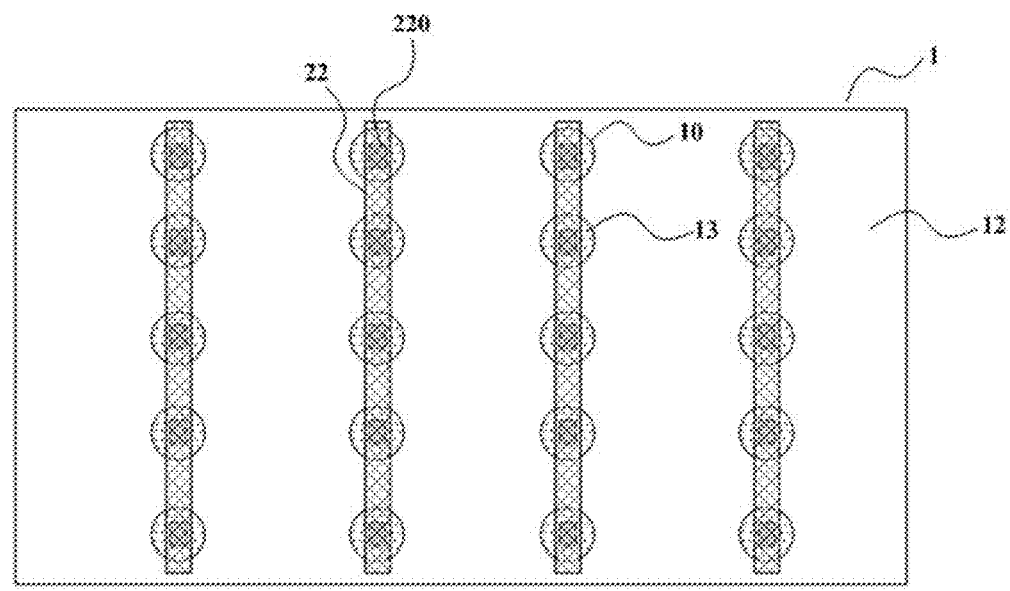
FIG. 3 is a diagram illustrating a top view of an exemplary backplane and LED bar in a narrow viewing angle mode according to disclosed embodiments.

Referring to FIG. 1A, FIG. 1B, FIG. 2, and FIG. 3, the present disclosure provides an exemplary backlight module. Specifically, FIG. 1A is a diagram illustrating a cross-sectional view of an exemplary backlight module according to disclosed embodiments. FIG. 1B is a diagram illustrating a cross-sectional view of an exemplary backlight module according to disclosed embodiments. FIG. 2 is a diagram illustrating an exemplary light-source component according to disclosed embodiments. FIG. 3 is a diagram illustrating a top view of an exemplary backplane and LED bar according to disclosed embodiments.

The disclosed backlight module may include a backplane 1, a plurality of light-source components 2, and an optical member 4. The backplane 1 may have a holding space, and the plurality of light-source components 2 may be disposed inside the holding space of the backplane 1. The optical member 4 may be disposed above the plurality of light-source components 2. The optical member 4 may be placed, such that light emitted by the light source components 2 may exit the backplane 1 and transmit through the optical member 4 to reach the user's eyes. In the present disclosure, the dashed arrows may represent the directions of the emitted light.

Further, a plurality of scattering pits 10 may be disposed on the inner bottom 12 of the backplane 1. The light-source component 2 may include a LED bar 22 and a plurality of LEDs 220 on the LED bar 22. The light-emitting angle of LEDs 220 may be smaller than about 40 degrees. The LED bar 22 may be rotated until the LEDs 220 face towards the backplane inner bottom 12, or may be rotated until the LEDs 220 face towards the optical member 4.

Further, the light-source component 2 may also include a fixed support 21 and a driving unit 23. The fixed support 21 may be connected to the backplane 1, the LED bar 22 may be pivoted to the fixed support 21, and the driving unit 23 may be configured to drive the LED bar 22 to rotate. Further, a support board 3 may also be disposed between the plurality of light-source components 2 and the optical member 4 in the backlight module.

An existing light-emitting angle of the LEDs used in a backlight module is often between about 115 degrees and about 120 degrees. In the present disclosure, to realize the viewing angle switch, the light-emitting angle of the LEDs 220 on the LED bar 22 may be smaller than about 40 degrees, and approximately collimated light may be the optimal choice.

When the disclosed backlight module is applied to a display device, the display device may switch between wide viewing angle display function and narrow viewing angle display function. Specifically, as shown in FIG. 1A, when the LED bar 22 is driven to rotate until the LED 220 faces towards the support board 3, light emitted from the LEDs 220 may pass through the support board 3 and the optical member 4 and exit the optical member 4 at a first exiting angle range, e.g., including a small light-emitting angle range. Accordingly, the display device may operate in a narrow viewing angle mode, thus realizing anti-peeping and effectively protecting personal information and privacy.

Further, as shown in FIG. 1B, when the LED bar 22 is driven until the LED 220 faces towards the backplane inner bottom 12, light emitted from the LEDs 220 may be scattered by the scattering pits 10 and exit the backplane 1 through the support board 3 and exit the optical member 4 at a second exiting angle range, e.g., including a large light-emitting angle range. Accordingly, the display device may operate in a wide viewing angle mode, and the users may share contents displayed on the display device with other people. Thus, the display device containing the disclosed backlight module may be applied in various applications. The use of the display device may have more flexibility.

Figure 6:
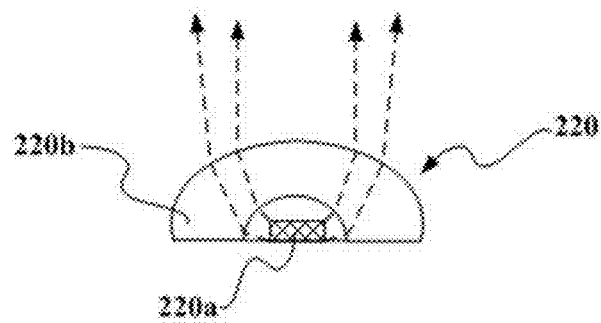
FIG. 6 is a diagram illustrating an exemplary LED according to the disclosed embodiments.

As shown in FIG. 6, each LED 220 may include a light-emitting chip 220a and a lightshade 220b, and the lightshade 220b may adjust the light-emitting angle of the LED 220 to be within about 25 degrees to about 35 degrees. By adjusting the structure of the lightshade 220b, the light-emitting angle of the LED 220 may be adjusted, thus the viewing-angle of the display device may be precisely controlled.

Further, as shown in FIG. 1A and FIG. 1B, each LED 220 on the LED bar 22 may correspond to one scattering pit 10. In one embodiment, the LED 220 may be disposed in line with the center of the scattering pit 10. As shown, the inner bottom 12 of the backplane 1 may further have a flat area among the plurality of scattering pits 10, e.g., between adjacent scattering pits 10. In some embodiments, the flat area may cover all areas of the backplane inner bottom 12 other than those having the scattering pits 10.

In one embodiment, the LED 220 may be disposed within a corresponding scattering pit having a top at a same plane as the flat area of the backplane inner bottom 12. In another embodiment, the LED 220 may be disposed in a corresponding scattering pit having a top slightly higher than the flat area of the backplane inner bottom 12.

In various embodiments, the LED 220 may have at least one dimension smaller than the scattering pit 10, such that there is a sufficient space to adjust rotation of the LED 220 corresponding to the scattering pit, and thus adjust the light emitted there-from. In this manner, the light-emitting area or the illumination area, and the light-emitting angle or the illumination angle, provided by the backlight module may be controlled and adjusted.

In the case when the LED 220 has a dimension much larger than the corresponding scattering pit 10, the light emitted from the LED 220 may cover the entire surface of the scattering pit 10. This makes it difficult, even with the adjustment of the orientation of the illumination of the LED, to adjust the ultimate angle range exiting the backplane 1 and exiting the optical member 4.

Further, as shown in FIG. 3, an optical dot 13 may be disposed on surface of each scattering pit 10. When the LEDs 220 face towards the backplane inner bottom 12, light emitted from the LEDs 220 may be scattered by the optical dots 13 on surface of the scattering pits 10, and exit from the backplane 1 to pass through the support board 3 and the optical member 4 at a relatively large light-emitting angle. Because the backplane 1 is often made of a metallic material, using such a design, the dimension of the scattering pits 10 may be designed to be relatively large, thus lowering the processing difficulty, improving the fabrication precision, and reducing the fabrication cost. A shown in FIG. 1A and FIG. 1B, a reflection layer 11 may be disposed on the flat area of the backplane inner bottom 12. For example, the reflection layer 11 may be a white reflection layer or a silver reflection layer. The reflection layer 11 may reflect the light, thus improving the light utilization rate and the display quality of the display device.

Figure 4:
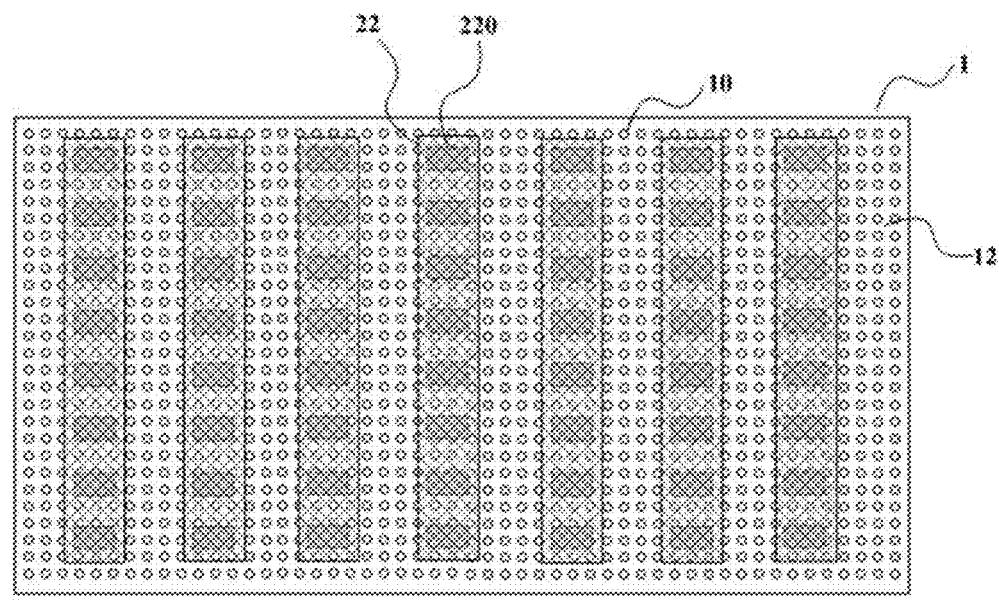
FIG. 4 is a diagram illustrating a top view of another exemplary backplane and LED bar in a narrow viewing angle mode according to disclosed embodiments.
Figure 5:
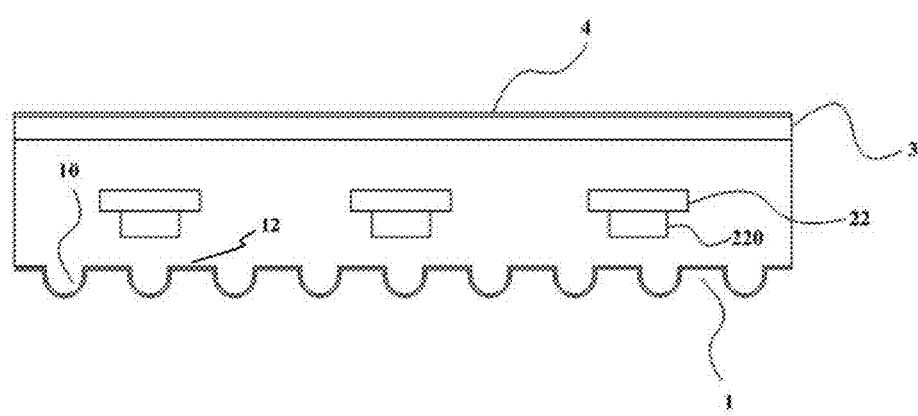
FIG. 5 is a diagram illustrating a cross-sectional view of another exemplary backlight module in a narrow viewing angle mode according to disclosed embodiments.

As shown in FIG. 4 and FIG. 5, in one embodiment, each LED 220 on the LED bar 22 may correspond to a plurality of scattering pits 10. The plurality of scattering pits 10 may have a function similar to dots. When the LEDs 220 face towards the backplane inner bottom 12, light emitted from the LEDs 220 may be scattered by the plurality of scattering pits 10 and exit the backplane 1 to pass through the support board 3 and the optical member 4 at a relatively large light-emitting angle.

Specific shapes of the scattering pits 10 may not be limited as long as the scattering pits 10 scatter the lights. Optionally, as shown in FIG. 1A, the scattering pits 10 may have an arc-shaped cross section, although any forms of cross section may be included for the scattering pit 10.

Specific types of the driving unit 23 may not be limited, for example, the driving unit 23 may be a driving motor, or a micro-motor, etc. As shown in FIG. 2, in one embodiment of the present disclosure, the driving unit 23 may be an electric motor, one end of the LED bar 22 may be pivoted to the fixed support 21, and the other end of the LED bar 22 may be connected to an output shaft of the electric motor. Optionally, the electric motor may be a reciprocating motor, and the rotating range of the output shaft may be about 180 degrees. Using such a technical solution, the control logic of the electric motor may be relatively simple, thus the rotation position of the LED bar 22 may be precisely controlled.

The support board 3 may be a polymethylmethacrylate (PMMA) support board, or a polycarbonate (PC) support board. The support board 3 may play a role in supporting the optical member 4.

The present disclosure also provides a display device, including any above-described backlight module. The display device may switch between the wide viewing angle and the narrow viewing angle display functions, thus may be applied in a plurality of occasions and show greatly improved usage flexibility. The specific types of the display device may not be limited, for example, the display device may be a TV station, a display device, and a tablet, etc.

The foregoing description of the embodiments of the disclosure has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated.

It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a backplane containing a plurality of scattering pits;
an optical member disposed above the backplane; and
a plurality of light-source components each including a plurality of light-sources, and configured between the optical member and the plurality of scattering pits, each light-source component being rotatable to allow the plurality of light-sources having at least one of a first orientation toward the plurality of scattering pits and a second orientation toward the optical member, wherein the backplane further includes a flat area between adjacent scattering pits, wherein a reflection layer is on the flat area, and wherein the light-source component includes a driving unit which is an electric motor.

2. The backlight module according to claim 1, wherein: the light-source provides a light-emitting angle of less than approximately 40 degrees.

3. The backlight module according to claim 1, wherein: the backplane further contains a holding space for holding the plurality of light-sources.

4. The backlight module according to claim 1, wherein: each light-source corresponds to a plurality of scattering pits.

5. The backlight module according to claim 1, wherein:
the light-source has at least one dimension smaller than a corresponding scattering pit.

6. The backlight module according to claim 1, wherein:
a surface of the scattering pit includes optical dots.

7. The backlight module according to claim 1, wherein:
the scattering pit includes an arc-shaped cross section.

8. The backlight module according to claim 1, wherein:
the plurality of light-sources includes a plurality of light emitting diodes (LEDs), configured on an LED bar.

9. The backlight module according to claim 1, further comprising:
a support board between the optical member and the plurality of light-source components.

10. The backlight module according to claim 1, wherein:
the scattering pit is configured to scatter light emitted from one or more corresponding light-sources, wherein the scattered light passes through and exits the optical member in a first exiting angle range; and
the optical member is configured to receive light emitted from one or more corresponding light-sources, wherein the light passes through and exits the optical member in a second exiting angle range, the first exiting angle range being greater than the second exiting angle range.

11. A display device, comprising the backlight module according to claim 1.

12. The backlight module according to claim 4, wherein:
each light-source corresponds to one of the plurality of scattering pits.

13. The backlight module according to claim 8, wherein:
the light-source component also includes a fixed support
the fixed support is connected to the backplane,
the LED bar is pivoted to the fixed support, and
the driving unit is configured to drive the LED bar to rotate.

14. The backlight module according to claim 8, wherein:
the LED includes a light-emitting chip and a lampshade, and
the lampshade is configured to adjust a light-emitting angle of the LED.

15. The backlight module according to claim 13, wherein:
one end of the LED bar is pivoted to the fixed support, and other end of the LED bar is connected to an output shaft of the electric motor.

16. The backlight module according to claim 14, wherein:
the light-emitting angle of the LED is adjusted between approximately 25 degrees to approximately 35 degrees.

17. The backlight module according to claim 15, wherein:
the electric motor is a reciprocating motor, and a rotating range of the output shaft is approximately 180 degrees.

18. The backlight module according to claim 9, wherein:
the support board is one of a polymethylmethacrylate support board and a polycarbonate support board.

19. The display device according to claim 11, wherein:
when the plurality of light-sources is at the first orientation toward the plurality of scattering pits, the display device provides a wide viewing angle mode, and
when the plurality of light-sources is at the second orientation toward the optical member, the display device provides a narrow viewing angle mode.

* * * * *